United States Patent [19]

Doughty

[11] 3,871,893

[45] Mar. 18, 1975

[54] LIGNIN AMINES AS ASPHALT EMULSIFIERS

[75] Inventor: Joseph B. Doughty, Sullivan's Island, S.C.

[73] Assignee: Westvaco Corporation, New York, N.Y.

[22] Filed: June 21, 1972

[21] Appl. No.: 264,864

Related U.S. Application Data

[62] Division of Ser. No. 134,856, April 16, 1971, abandoned.

[52] U.S. Cl. ............... 106/277, 106/123, 106/278, 252/311.5
[51] Int. Cl. ...................... C08h 13/00, C08k 1/162
[58] Field of Search . 106/278, 277, 123 R, 123 LC; 252/311.5; 260/123, 124

[56] References Cited
UNITED STATES PATENTS

| | | | |
|---|---|---|---|
| 2,706,688 | 4/1955 | Sommer et al. | 106/273 N |
| 2,709,696 | 5/1956 | Wiest | 252/311.5 X |
| 2,863,730 | 12/1958 | Ball, Jr. | 252/311.5 X |
| 3,123,569 | 3/1964 | Borgfeldt | 106/277 X |
| 3,126,350 | 3/1964 | Borgfeldt | 106/277 X |
| 3,347,842 | 10/1967 | Melnychyn | 106/123 R X |
| 3,355,400 | 11/1967 | Smith et al. | 106/123 R X |
| 3,407,188 | | Cavagna | 260/124 |
| 3,470,148 | 9/1969 | Allen | 260/124 A |
| 3,718,639 | 2/1973 | Falkehag et al. | 260/124 A |

Primary Examiner—Joseph L. Schofer
Assistant Examiner—H. J. Lilling
Attorney, Agent, or Firm—Richard L. Schmalz; Ernest B. Lipscomb, III

[57] ABSTRACT

Lignin amines are formed by reacting a secondary or a tertiary amine and a halohydrin with lignin. The amine and halohydrin are preferably reacted together to form a glycidylamine intermediate. From 1–10 moles of the glycidylamine intermediate per 1,000 grams of lignin are then reacted together. In preferred embodiments of the invention, the halohydrin is epichlorohydrin, the secondary amine is dimethyl and the tertiary amine is trimethyl amine. These lignin amines are useful as surface active agent, especially in cationic asphalt emulsions.

4 Claims, No Drawings

LIGNIN AMINES AS ASPHALT EMULSIFIERS

CROSS-REFERENCE TO RELATED APPLICATION

This application is a divisional of my co-pending application, Ser. No. 134,856, filed Apr. 16, 1971 and now abandoned.

BACKGROUND OF THE INVENTION

This invention relates to lignin amines. More particularly, this invention relates to glycidylamine lignin products that are useful as surface active agents.

Lignin amines have been made by a variety of methods for numerous uses. For instance, lignin amines have been made via the Mannich reaction, in accordance with the procedure described in U.S. Pat. No. 2,709,696 to Wiest et al. In this reaction, lignin is reacted with formaldehyde and a secondary amine. These lignin amines are reacted at the ortho position to the phenolic group in the lignin. Other Mannich-type lignin amines include, for example, quaternary ammonium salts of lignin made according to the disclosure of Cavagna in U.S. Pat. No. 3,407,188. These lignin amines have found such uses as tanning agents (Weist et al.), corrosion inhibitors, (Ball, U.S. Pat. No. 2,863,780) and asphalt emulsion stabilizers (Borgfeldt, U.S. Pat. No. 3,126,350).

It is a general object of this invention to produce lignin amines via the amine-halohydrin approach. A further object of this invention is to produce lignin amines that are useful in asphalt emulsions. Further objects, features and advantages of this invention will be evident from the following disclosure.

SUMMARY OF THE INVENTION

It has been found that lignin amines may be made by reacting a secondary amine such as dimethylamine, or a tertiary amine, such as trimethyl amine, and a halohydrin, such as epichlorohydrin in equimolar amounts to form a glycidylamine intermediate. The glycidylamine intermediate is then reacted in an aqueous solution of alkali lignin at a ratio of one to ten moles of glycidylamine per 1000 grams of the lignin to form the lignin amine. The lignin amine may then be dried, if desired.

DETAILED DESCRIPTION OF THE INVENTION

The lignin amines of this invention are lignins wherein the lignin molecule has been modified with a glycidylamine. The products of this invention exhibit increased surface activity with a variety of materials. The lignin amines are produced by reaction of alkali lignin with epoxide or halohydrin group of the glycidylamine. The other end of the glycidylamine comprises a tertiary or quaternary ammonium radical. As hereinafter described in greater detail, the glycidylamine intermediate and the glycidylamine lignin reactions may be effected sequentially in either order, and with or without isolation of the glycidylamine intermediate, or simultaneously, depending on the composition and purity desired. It is preferred, however, to make the glycidylamine intermediate prior to the reaction with lignin.

Amines suitable for this invention are represented by the general formulas:

Secondary 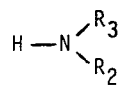    Tertiary 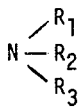

For the secondary amines $R_2$ and $R_3$ are from the group consisting of alkyl, substituted alkyl, alkene, aryl and arylalkyl, but the total of both $R_2$ and $R_3$ should contain not more than 30 carbon atoms. It is preferred to use those secondary amines possessing at least one methyl group attached directly to the nitrogen. The preferred secondary amines are highly reactive and during reaction some cross-linking occurs thereby yielding lignin amines that are effective surface active agents but because of their high molecular weight are insoluble. By way of example, the following secondary amines are particularly suitable for carrying out this invention; dimethylamine, diethylamine, diethanolamine, morpholine, dipropylamine, di-isopropylamine, dialkylamine.

For the tertiary amines, $R_1$, $R_2$ and $R_3$ are from the group consisting of alkyl, substituted alkyl, alkene, aryl, and arylalkyl, but the total of three of $R_1$, $R_2$ and $R_3$ should contain not more than 30 carbon atoms. If all three $R_1$, $R_2$ and $R_3$ are not the same and if $R_3$ contains up to 18 carbon atoms, then $R_1$ and $R_2$ should preferably be from the group consisting of methyl and ethyl, and if $R_1$ and $R_2$ are jointed to form a ring, then $R_3$ should preferably be from the group consisting of methyl and ethyl. It is preferred to use those tertiary amines possessing at least two methyl groups attached directly to the nitrogen because of their superior reactivity to epihalohydrin to form the desired intermediate. This reactivity is retained even when the third group of the tertiary amine contains as many as 18 carbon atoms, such as is found in dimethylstearyl amine. This high reactivity is believed to result from the low order of steric hindrance imparted by the two methyl groups, allowing for intimate contact of epihalohydrin with the free electron pair of the tertiary amino nitrogen. Selection of a tertiary amine in order to obtain an acid soluble lignin amine may be dependent upon the degree of reactivity of the tertiary amine. By way of example, the following dimethyl tertiary amines may be mentioned as particularly suitable for carrying out this invention; trimethyl, dimethyl-benzyl, dimethyldodecyl, and dimethylstearyl amines. However, other tertiary amines such as triethylamine, triethanolamine, N-ethyl and N-methyl morpholine, N-ethyl and N-methyl piperidine, methyl diallylamines, tripropylamine, triisopropylamine and triallylamine may also be used.

The secondary or tertiary amine is reacted with halohydrin, preferably an epihalohydrin of the general formula:

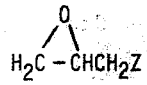

where Z is chlorine, bromine or iodine. The reaction products will be referred to throughout the specification as "glycidylamine intermediates."

Preparation of the glycidylamine intermediate is carried out by simply mixing equimolar amounts of the secondary or tertiary amine and epihalohydrin in water at or near about 10°C. allowing the reaction to come to room temperature and proceed while stirring until the glycidylamine reaction is complete. The glycidylamine may be concentrated and purified, if desired, to remove unreacted epihalohydrin and amine. The glycidylamine intermediate, in either the epoxide form or the halohydrin form, is reacted with lignin.

The lignins employed to make the products of this invention include lignins from any source such as sulfite lignins from acid and neutral pulping processes, alkali lignins from the sulfate (kraft) pulping process and lignins derived from other alkaline pulping processes such as the soda or modified soda processes. Likewise, lignin known as "hydrolysis lignin" obtained from the hydrolysis of lignocellulosic materials in manufacturing wood sugars, or "hydrotropic lignins" derived from hydrotropic pulping processes may be used. Other hydroxyl group-containing non-carbohydrate wood components, such as "bark lignin" and extractives, sometimes called polyphenols, may also be employed provided the basic lignin structure has not been excessively altered in the modification procedures. Alkali lignins that have been modified by sulfonation, nitration, chlorination and demethylation may also be used. The lignin starting material, preferably an alkali lignin, used to form the amines is in the ionized form at neutral or alkaline conditions.

The reaction of lignin and the glycidylamine intermediate may be illustrated by the following reaction wherein the reaction product of trimethylamine and epichlorohydrin is representative:

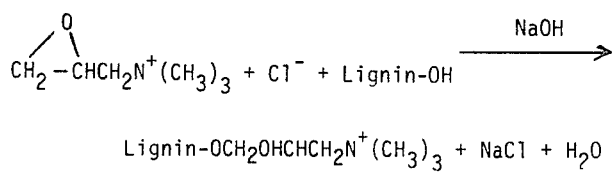

The lignin amines of this invention are readily prepared by dissolving the lignin into a suitable solvent such as water, dioxane, lower aliphatic alcohols and the like, in the presence of a strongly alkaline catalyst and adding the lignin to the glycidylamine intermediate. The reaction occurs at room temperature; however, the addition of heat, for instance, refluxing, and increased catalyst tend to speed-up the reaction rate. The lignin may be added to the amine-halohydrin reaction prior to its completion, but the usual case is to add the lignin to the glycidylamine intermediate after the aminehalohydrin reaction is complete. Anhydrous reaction conditions can be employed but it is preferred that water be present in the reaction system. The time required to accomplish the glycidylamine-lignin reaction will vary from about 0.5 to about 24 hours, or longer, more usually from about 1 to about 8 hours. In effecting the glycidylamine-lignin reaction, the proportion of glycidylamine intermediate to lignin may vary from about one mole to about 10 moles of the glycidylamine intermediate per 1000 grams of lignin. The products may, if desired, be dried by conventional methods, such as spray drying.

Alkaline catalysts, such as sodium hydroxide, potassium hydroxide lithium hydroxide, tetramethyl ammonium hydroxide, tetraethyl ammonium hydroxide, and the like, are employed to catalyze the glycidylamine lignin reaction. The amount of catalyst utilized will depend primarily upon whether the glycidylamine intermediate employed is in the halohydrin form or the epoxide form, but also upon the amount of glycidylamine used and the degree of reaction desired. Where the halohydrin form is employed, an amount of catalyst of from slightly more than 1 to about 3 moles per mole of halohydrin is satisfactory, while when the epoxide form is employed, suitable amounts are from about 0.01 to about 2 moles per mole of epoxide. If an aqueous medium has been used, the excess catalyst and salts, if desired, may be removed by washing.

These lignin amines are suitable for a variety of uses where surface active products are needed, such as cationic asphalt emulsion stabilizers. Cationic asphalt emulsions are generally formed by adding the lignin amine to the water in which the asphalt is emulsified and adjusting the pH to between 1 and 3 by adding a suitable acid. The asphalt-in-water emulsion is then formed in the conventional manner by agitating the combined phases. The asphalt content will range from about 30 to about 75% by weight, with 55 to 65% being preferred. The cationic lignin amine is present in the final emulsion in a concentration ranging from about 0.2 to about 2.0% by weight with water and other emulsifiers making up the balance of the emulsion. Asphalt emulsions with penetration values ranging from about 40 to about 300 may be stabilized with the cationic lignin amines of this invention.

Conventional compatable emulsifiers may also be employed in small amounts, if they do not adversely impair the improved properties of the emulsions attained in accordance with the invention. Particularly advantageous compatable emulsifiers are cationic and non-ionic emulsifiers. These emulsifiers are used in concentrations ranging from about 0.01% to about 2% by weight, usually about 1%. Thus, a non-ionic emulsifier, for instance, one of the ethylene glycol polyethers sold in the trade under the trademark "Igepals" may be added. Cationic emulsifiers include, for instance, a N-alkyl trimethylene diamine sold under the trademark "Duomeens." Yet another alkyl-substituted imidazoline from the group of materials sold under the trademark "Nalcamines." An example of this latter group being 1-(2aminoethyl)-2-n-2-imidazoline. These cationic emulsifiers provide for a homogeneous distribution of the bituminous binder. In other words, the emulsions made according to this invention to conform closely with the ASTM D-244 Tests, can be more easily handled through pumps and spray nozzles, and will set up satisfactorily upon application.

The lignin amines employed to stabilize the asphalt emulsions, in accordance with the invention, are added to the aqueous phase either as such or in the form of water-soluble salts e.g., as hydrochloride salts or as alkali metal salts of lignin amine and adjusting the acidity to the desired pH. After the emulsion has been prepared, it may be either stored until needed on the job; or it may be mixed with the aggregate corresponding to the intended application at a central plant in a large pug-mill or a cement-mixer; or yet it may be taken immediately to the job site to be mixed there with the aggregate.

The practice of this invention may clearly be seen in the following examples. In these examples several different glycidylamine intermediates have been used for reaction with lignin. These glycidylamine intermediates were made as follows:

Glycidylamine "A": Epichlorohydrin (97 gm) was added slowly to 181 grams of chilled (10°C.) 25% aqueous solution of dimethylamine. The total solution was allowed to come to room temperature slowly and kept at this temperature over night. The total mixture was divided in half. One half was retained unaltered (glycidylamine "A I") and the other one half was treated with sodium hydroxide pellets at or below 10°C. The alkali treated portion separated into two layers. The top layer was separated with a separatory funnel (glycidylamine "A II") and used for reaction with lignin.

Glycidylamine "B": Epichlorohydrin (192 gm) was slowly added to a chilled (10°C.) solution of 146 g. diethylamine in 192 ml water. The whole mixture was treated while cold (10°C.) with sodium hydroxide pellets and two layers formed. The top layer was separated and used to react with lignin.

Glycidylamine "C": Epichlorohydrin (18.5g) was slowly added to a chilled (10°C.) solution of 20.2 g triethylamine in 100 ml of water. The solution as prepared was used for reaction with lignin.

EXAMPLE 1

In this example, kraft pine lignin either as the free lignin or as the sodium salt was reacted with glycidylamines in aqueous slurry or solution. Ten grams of the kraft pine lignin were mixed with water and the respective glycidylamine and in some cases sodium hydroxide was added to effect solution of the lignin during reaction. The mixes were heated and stirred well for various lengths of time. Samples of each reaction were tested for solubility at various pH values and by selective acidification lignin amine was recovered from the reaction mixes and then nitrogen content determined as a measure of reactivity of the glycidylamine and lignin. The results of these tests are shown in the following table.

| Glycidyl-amine Reacted | Reaction Conditions | Nitrogen Content % |
|---|---|---|
| "A I" | 50 ml H$_2$O, 60°C, 4 hours | 0.3 |
| | 50 ml H$_2$O, 4 ml 50% NaOH, 60°C, 4 hours | 1.0 |
| | 50 ml H$_2$O, reflux 5 hours | 0.8 |
| | 50 ml H$_2$O, 4 ml 50% NaOH, reflux 7 hours | 0.8 |
| "A II" | 50 ml H$_2$O, 4 hours | 0.8 |
| | 50 ml H$_2$O, 4 ml 50% NaOH, 60°C, 4 hours | 0.9 |
| | 50 ml H$_2$O, reflux 6 hours | 0.9 |
| | 50 ml H$_2$O, 4 ml 50% NaOH, reflux 5 hours | 0.4 |
| B | 50 ml H$_2$O, 60°C, 4 hours | 1.1 |
| B | 50 ml H$_2$O, 2 ml 50% NaOH, 60°C, 4 hours | 1.4 |
| C | 50 ml H$_2$O, 2 ml 50% NaOH, 60°C, 5 hours | 0.6 |
| | 50 ml H$_2$O, 4 ml 50% NaOH, 60°C, 5 hours | 0.9 |
| | 50 ml H$_2$O, 7 hours, Room Temp. | 0.7 |

Products having 0.3% and 0.4% nitrogen suggest that one glycidylamine was added at about every 2 and 3 lignin units of 1000. Those having around 1% nitrogen may contain one glycidylamine for each lignin unit. The products having the higher nitrogen content were more soluble in water at lower pH values and the first signs of precipitation were at lower pH values as the solutions were acidified. These lignins are slightly soluble in aqueous solutions at pH values below 10. These data suggest that the reaction of the glycidylamine with the lignin should proceed better with alkali present and in selected amounts and at lower temperatures.

EXAMPLE 2

The glycidylamine intermediate was made by mixing 4.6 grams of epichlorohydrin and 5.0 grams of triethylamine with 50 ml. of water and refluxing for 2.5 hours. A lignin solution was formed by adding to 4.0 grams of NaOH (50%), 50 ml. of water and stirring. Into this NaOH solution 10.7 grams of kraft lignin (at 93.0% solids) was dissolved. The lignin solution was then added to the glycidylamine solution and the whole heated for about 3 hours. A small sample of the reaction product was recovered by acidification to pH 1 with concentrated hydrochloric acid. The product was washed well with water on the filter and dried in an oven at 105°C. This sample contained 0.9% nitrogen. The acidified filtrate was brown in color indicating portions of the amine lignin was soluble at the low pH value. The soluble portion, was richer in amine content.

EXAMPLE 3

A glycidylamine was made by a procedure described for glycidylamine "A II" above except that 236 g of trimethylamine solution was used instead of the dimethylamine. An alkaline solution of kraft lignin was prepared using 10 g lignin, 30 ml water, and 1 ml 50% sodium hydroxide solution. To the lignin solution was added 21 ml of the glycidylamine amine separated by addition of the alkali pellets. An extra 1 ml of 50% alkali was added to the whole mixture to get complete solution of the lignin. This mixture was then heated at 50°C. for 20 hours. A sample of the mix was added to 30 ml of water and hydrochloric acid added carefully as the pH of the mix was reduced. Lignin first precipitated at pH 11.4 and more and more precipitated as the pH was reduced to 3.5. At pH 3.5 the lignin began to redissolve and the dilute solution became clear indicating complete solution. The trimethyl glycidylamine seems more soluble in water at low pH values than the triethyl product described in Example 1.

EXAMPLE 4

Epichlorohydrin (10 grams) was added slowly to 15 ml of 25% aqueous solution of trimethylamine in a chilled 125 ml Erlenmeyer flask. The mixture was heated at 60°–70°C. in a water bath for 3 hours. This solution was then added slowly with a good stirring to a solution of 20 grams kraft lignin, 100 ml of water, and 8 grams of 50% sodium hydroxide. The whole mixture was heated to a water bath for 3 hours at or near 70°C. A sample of 2 ml of this mixture was dissolved in 30 ml of water and this solution acidified carefully with hydrochloric acid. The mixture was completely soluble above pH 11.4, some precipitation occurred below this pH which increased as the pH was lowered to pH 3. At this pH much of the lignin amine sample became soluble with the solution becoming dark brown. Portions of the lignin amine however did not dissolve even when the pH was dropped to 1.0.

EXAMPLE 5

Fifty grams of kraft lignin were placed in a pint ball mill jar along with enough ½inch ceramic balls to occupy one third the volume of the mill. Ten grams triethylamine were carefully added on one side of the jar and 9.2 grams of epichlorohydrin were added on the opposite side. The jar lid was quickly attached and tightly closed and then the whole mixture milled for four hours. The jar was opened and much of the lignin mix found on the side. This was scraped down, the jar was closed, and milling continued. The next day, the mixed material (61.6 g) was recovered from the jar as a dry powder. One gram was placed in 29 ml of water and the mix well stirred. Its pH was 9.8 and portions of the powder was soluble in the water. The sample and water were made alkaline with 50% sodium hydroxide to pH 11.5 at which all lignin amine became soluble. This alkaline solution was carefully acidified with hydrochloric acid and at pH 8 to 9 precipitation started. As the pH was lowered the whole sample gelled and became thicker as the pH was lowered to 1.0. The gel was very dark brown showing portions of the lignin amine was soluble at acid pH values.

EXAMPLE 6

This example illustrates the preparation of lignin amines of this invention using lignins from barks and from peat.

The lignins used were prepared by reaction of the barks and peat with sodium hydroxide at elevated temperatures. Five hundred grams samples of mixed hardwood bark and mixed pine barks collected at a woodyard of a pulp and paper plant in the southeastern part of the United States and a similar weight sample of peat humus were each mixed with 2500 ml of water containing 300 g of 50% sodium hydroxide. The three mixes were heated for three hours in a closed autoclave at 160°C. to 170°C. The reacted mixes were then filtered to remove insoluble pulps and other matter. The three solutions were acidified to pH 2 with sulfuric acid and the acidified mixes heated to 95°C. to coagulate the precipitated lignins. The three lignins were recovered by filtration, washed well on the filter, and dried at 105°C. in an oven.

Ten gram samples of the two bark lignins and the peat humus lignin were each dissolved in 40 ml of water containing enough sodium hydroxide to completely dissolve them. To each was added 20 ml of the Glycidylamine "C". These mixes were heated at 50°C. for 6 or more hours. Two ml samples of each reaction mix were added to 40 ml of water and the total solutions acidified to pH 2 with hydrochloric acid. Some lignin precipitated in the brown solutions. The three mixes were heated to 100°C. in an effort to coagulate the lignin for filtration. All three lignins became soluble and could not be filtered off. The acid solubility of these lignin products was a good indication that lignin amines had been formed.

EXAMPLE 7

A cationic bituminous emulsion was prepared to show the use of the lignin amines of this invention. The emulsion was prepared by adding the lignin amine from Example 2 to water and adjusting the pH to about 2.0 with hydrochloric acid, adding an asphalt having a penetration value of 170, adding the emulsifiers, and then heating the mixture to fluidity and emulsifying. The emulsion was made of the following components.

| Material | Amount | % on Asphalt |
|---|---|---|
| Water | 550 ml. | |
| Lignin Amine | 15 gms. | 1.725 |
| 4N, HCl | 10.7 ml. | |
| Nalcamine G-39-M[1] | 0.75 gm. | 0.086 |
| Igepal CO-990[2] | 7.5 gm | 0.862 |
| Asphalt | 800 gm. | |

Notes:
[1]Nalcamine G-39-M is 1-(2 aminoethyl)-2-N-alkyl-2 imidazoline
[2]Igepal CO-990 is Nonylphenoxypoly (ethyleneoxy) ethanol The resulting emulsion was subjected to the following tests using A.S.T.M. D-244 Standards.

| Test | Value |
|---|---|
| Charge | slightly positive |
| Residue | 62.9% |
| Seive Residue | trace |
| Cement | trace |

The emulsion passed the A.S.T.M. Standards for a slow-break emulsion.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. An oil-in-water cationic bituminous emulsion of improved mechanical stability which comprises, from about 30 to about 75% by weight of bitumen as the dispersed phase, from about 0.2 to about 2.5% by weight of a watersoluble salt of a lignin amine product of the reaction of from 1 to 10 moles of a glycidyl/tertiary amine intermediate per 1000 grams lignin as the cation active emulsifier for dispersing said bitumen in water and water to make up 100% by weight as the continuous phase, the pH of the emulsion being adjusted to a value in the range from about 1 to 3.

2. An oil-in-water type cationic bituminous emulsion as defined in claim 1, wherein said bitumen is asphalt.

3. An oil-in-water type cationic bituminous emulsion as defined in claim 1 wherein said glycidyl/tertiary amine intermediate is formed by the reaction of epichlorohydrin and a tertiary amine.

4. An oil-in-water type cationic bituminous emulsion as defined in claim 1 wherein said lignin amine product is of a reaction of from 2 to 10 moles of a glycidyl/tertiary amine intermediate per 1,000 grams of lignin.

* * * * *